United States Patent
Wang (10) Patent No.: US 11,297,245 B2
(45) Date of Patent: Apr. 5, 2022

(54) ACTIVE CALIBRATION DEVICE AND METHOD FOR OBTAINING PARAMETERS USED TO CALIBRATE INFORMATION CONTAINED IN IMAGES CAPTURED BY AN INFRARED CAMERA DEVICE

(71) Applicant: TAIWAN MAIN ORTHOPAEDIC BIOTECHNOLOGY CO., LTD., Taichung (TW)

(72) Inventor: Min-Liang Wang, Taichung (TW)

(73) Assignee: Taiwan Main Orthopaedic Biotechnology Co., Ltd., Taichung (TW)

( * ) Notice: Subject to any disclaimer, the term of this patent is extended or adjusted under 35 U.S.C. 154(b) by 4 days.

(21) Appl. No.: 16/876,399

(22) Filed: May 18, 2020

(65) Prior Publication Data
US 2021/0227143 A1    Jul. 22, 2021

(30) Foreign Application Priority Data

Jan. 21, 2020   (TW) .................... 109102222

(51) Int. Cl.
  H04N 5/232  (2006.01)
  G06T 7/80  (2017.01)
  H04N 5/225  (2006.01)
  H04N 5/33  (2006.01)

(52) U.S. Cl.
  CPC ........... *H04N 5/23299* (2018.08); *G06T 7/80* (2017.01); *H04N 5/2256* (2013.01); *H04N 5/33* (2013.01)

(58) Field of Classification Search
  CPC .... H04N 5/23299; H04N 5/33; H04N 5/2256; G06T 7/80
  See application file for complete search history.

(56) References Cited

U.S. PATENT DOCUMENTS

| | | | |
|---|---|---|---|
| 7,084,386 B2* | 8/2006 | Bernardini | G01B 11/2504 250/208.1 |
| 9,204,121 B1* | 12/2015 | Marason | H04N 13/296 |
| 10,612,912 B1* | 4/2020 | Sullivan | G02B 27/425 |
| 2008/0097156 A1* | 4/2008 | Nakamura | A61B 34/20 600/117 |
| 2012/0069193 A1* | 3/2012 | Ramegowda | H04N 17/002 348/164 |

(Continued)

OTHER PUBLICATIONS

Search Report appended to an Office Action, which was issued to Taiwanese counterpart application No. 109102222 by the TIPO dated Jun. 24, 2020, with an English translation thereof (2 pages).

*Primary Examiner* — Lin Ye
*Assistant Examiner* — John H Morehead, III
(74) *Attorney, Agent, or Firm* — Michael Best & Friedrich LLP (57) ABSTRACT

An active calibration device is provided for obtaining parameters that are used to calibrate information contained in images captured by an infrared camera device. The active calibration device includes a base having at least one mounting surface; and a plurality of infrared (IR) light emitting components disposed on the mounting surface of the base. The IR light emitting components are arranged to form a predetermined pattern, and are configured to emit infrared light for receipt by a lens of the infrared camera device.

10 Claims, 4 Drawing Sheets

(56) References Cited

U.S. PATENT DOCUMENTS

| | | | |
|---|---|---|---|
| 2014/0119510 A1* | 5/2014 | Wang | G01N 23/04 |
| | | | 378/63 |
| 2016/0140713 A1 | 5/2016 | Martin | |
| 2017/0186146 A1* | 6/2017 | Raniwala | H04N 13/25 |
| 2017/0324952 A1* | 11/2017 | Lavache | H04N 5/33 |
| 2018/0343438 A1* | 11/2018 | Cho | G03B 35/00 |
| 2019/0132584 A1* | 5/2019 | Yu | H04N 5/3415 |
| 2019/0180475 A1* | 6/2019 | Nash | H04N 1/00087 |
| 2020/0371736 A1* | 11/2020 | Iversen | H04N 9/3102 |

\* cited by examiner

ACTIVE CALIBRATION DEVICE AND METHOD FOR OBTAINING PARAMETERS USED TO CALIBRATE INFORMATION CONTAINED IN IMAGES CAPTURED BY AN INFRARED CAMERA DEVICE

CROSS-REFERENCE TO RELATED APPLICATION

This application claims priority of Taiwanese Invention Patent Application No. 109102222, filed on Jan. 21, 2020.

FIELD

The disclosure relates to calibration, and more particularly to an active calibration device and a method for obtaining parameters used to calibrate information contained in images captured by an infrared (IR) camera device.

BACKGROUND

Image-guided surgical navigation can assist a surgeon in locating a surgical target (e.g., a lesion) more precisely and safely, or in finding a location for placing an implant (e.g., an electrode wire for deep brain stimulation, a pedicle screw, etc.). This technology may prevent major nerves from damage, reduce a size of surgical wound, promote surgery success rates, and improve postoperative recovery.

During surgery, to prevent light emitted by halogen lamps in the operating room from influencing image-guided surgical navigation, a conventional approach is to attach IR reflective markers on surgical instruments and/or the patient, use an IR light source to emit IR light in the operating room, and use an IR camera to capture IR light reflected by the IR reflective markers, so as to position the surgical instruments and/or the patient in three-dimensional space after performing image processing on images captured by the IR camera.

However, since the IR lens of the IR camera may have errors in, for example, depth of field, focal length, refraction angles, placement deviation, etc., imaging of the IR camera must be calibrated to enhance precision. Conventionally, such calibration is performed by capturing an image of a black-and-white checkerboard with a known size, and performing correction calculation such that a checkerboard pattern in the corrected image matches that of the black-and-white checkerboard. This conventional calibration process requires image pre-processing, such as edge detection, image recognition, etc., to be performed on the checkerboard pattern in the captured image prior to the calibration calculation. However, unavoidable errors, such as quantization errors, recognition errors, may occur during the image pre-processing, resulting in a bottleneck for promoting the precision of image-guided surgical navigation.

SUMMARY

Therefore, an object of the disclosure is to provide an active calibration device for obtaining parameters used to calibrate information contained in images captured by an IR camera device.

According to the disclosure, the active calibration device includes a base having at least one mounting surface, and a plurality of IR light emitting components disposed on the mounting surface of the base. The IR light emitting components are arranged to form a predetermined pattern, and are configured to emit infrared light for receipt by a lens of the infrared camera device.

Another object of the disclosure is to provide a method for obtaining parameters used to calibrate information contained in images captured by an IR camera device.

According to the disclosure, the method includes: providing an active calibration device as previously described, and storing two-dimensional pattern data and three-dimensional pattern data that correspond to the predetermined pattern in a storage component that is accessible to a processor; by the infrared camera device, capturing a first reference image of the active calibration device that is put in a first placement condition where the mounting surface is perpendicular to an optical axis of the lens of the infrared camera device and where the IR light emitting components face the infrared camera device; by the processor, obtaining the first reference image of the active calibration device, and obtaining image calibration parameters by correcting the first reference image based on the two-dimensional pattern data in such a way that the IR light emitting components in the first reference image thus corrected form the predetermined pattern; by the infrared camera device, capturing a second reference image of the active calibration device put in a second placement condition different from the first placement condition by one or more of i) rotating the base of the active calibration device that is in the first placement condition relative to an axis perpendicular to the mounting surface; ii) moving the base of the active calibration device that is in the first placement condition; and tilting the base of the active calibration device that is in the first placement condition; and by the processor, obtaining estimated three-dimensional coordinates of the IR light emitting components based on the second reference image of the active calibration device and the image calibration parameters, and obtaining coordinate calibration parameters by correcting the estimated three-dimensional coordinates of the IR light emitting components based on the three-dimensional pattern data in such a way that the three-dimensional coordinates of the IR light emitting components thus corrected match spatial positions of the IR light emitting components of the active calibration device arranged in the second condition.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
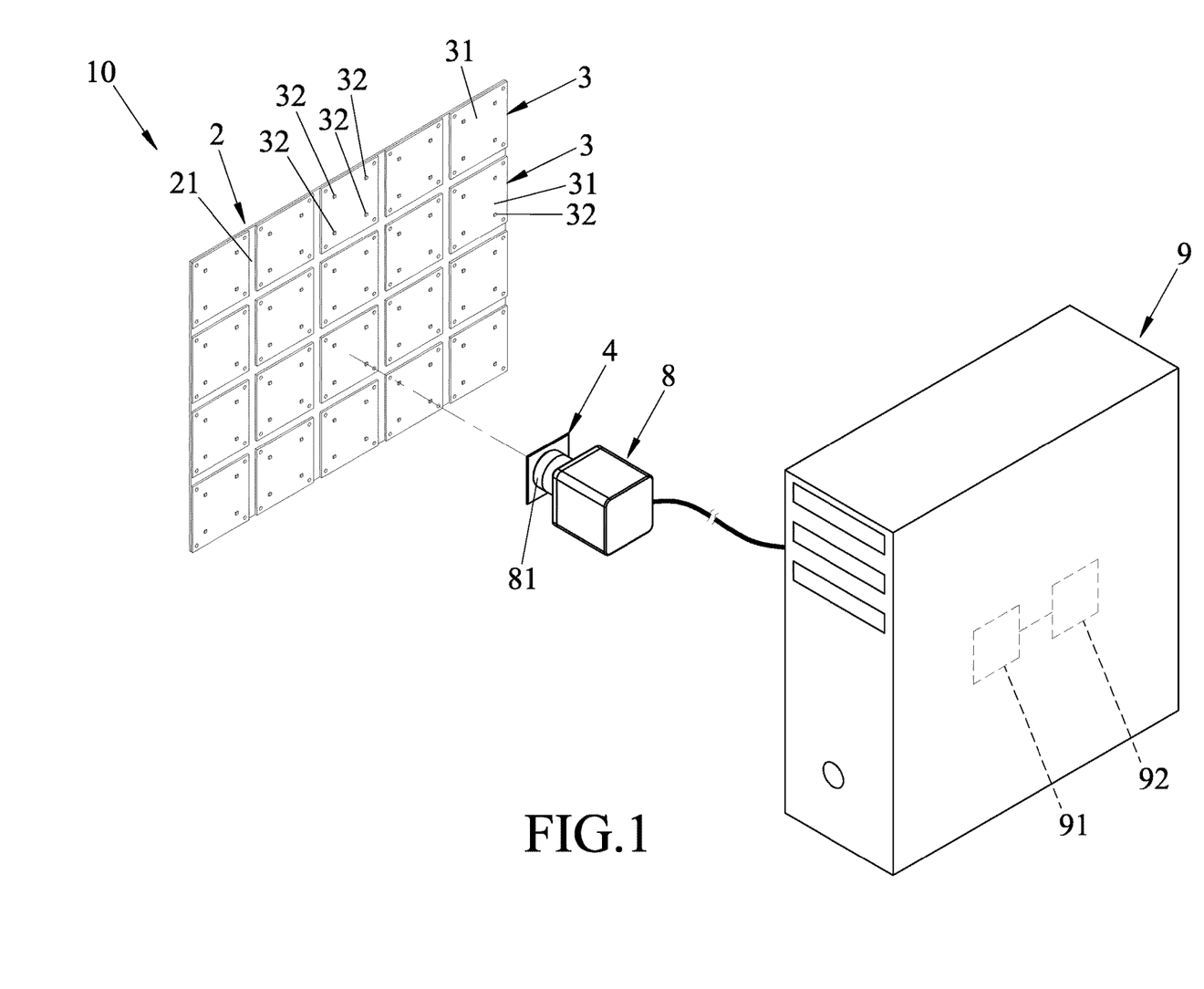
FIG. 1 is a perspective view illustrating a system that includes an embodiment of an active calibration device according to the disclosure, a computer device, and an IR camera device, wherein the embodiment of the active calibration device is for obtaining parameters used to calibrate information contained in images captured by the IR camera device.
Figure 2:
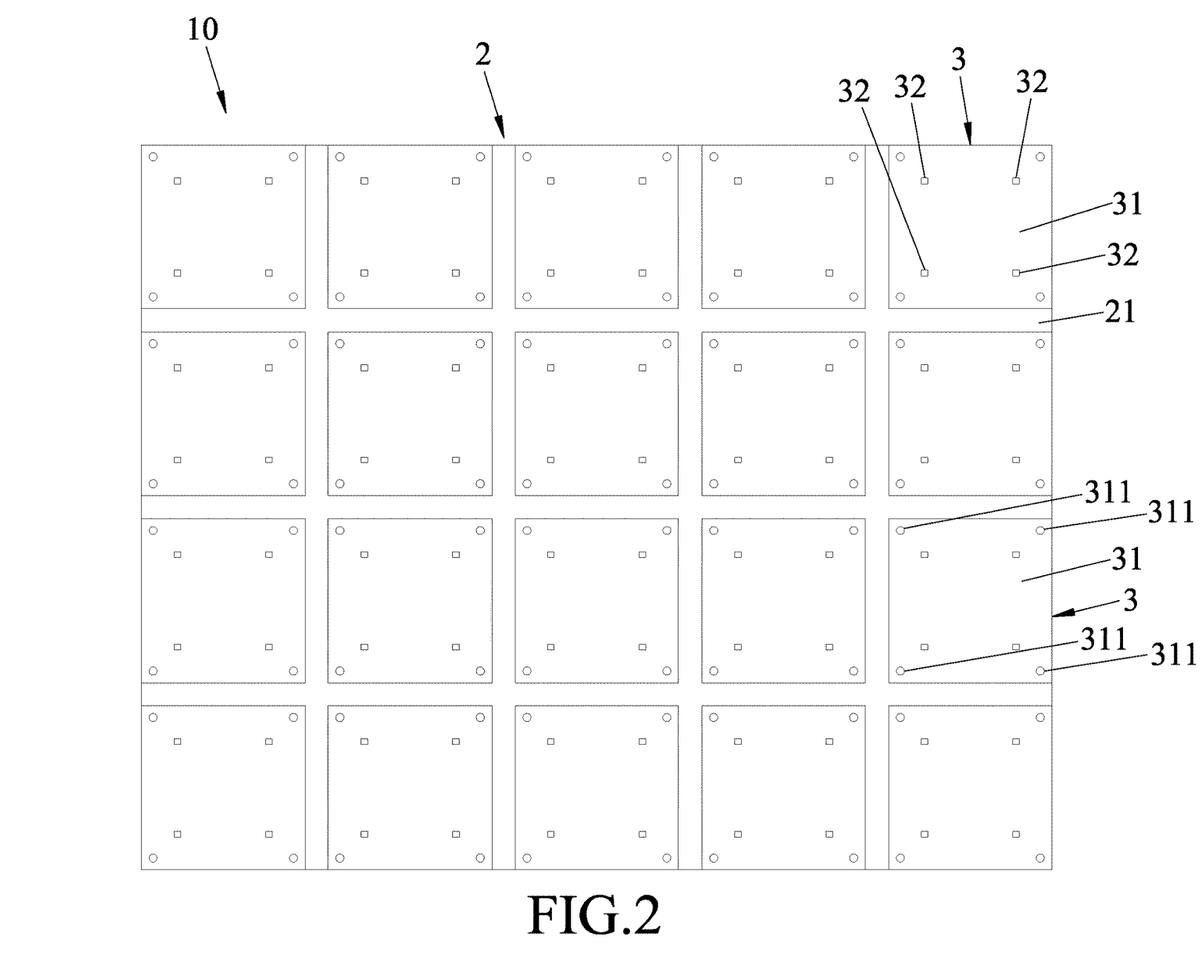
FIG. 2 is a schematic diagram illustrating a front view of the embodiment of the active calibration device.

Referring to FIGS. 1 and 2, an embodiment of an active calibration device 10 according to this disclosure is adapted for allowing a computer device 9 to obtain parameters used to calibrate information contained in images captured by an IR camera device 8. The active calibration device 10 includes a base 2 that has at least one mounting surface, and a plurality of circuit modules 3.

In this embodiment, the base 2 is a rectangular steel plate, and has a flat mounting surface 21 that is 390 mm by 310 mm in size, but this disclosure is not limited thereto. In other embodiments, the shape, the size and the material of the base 2 may be determined as required.

The circuit modules 3 are mounted to the mounting surface 21. Each of the circuit modules 3 includes a circuit board 31 mounted to the mounting surface 21, and at least one IR light emitting component 32 mounted to the circuit board 31. The IR light emitting components 32 of the circuit modules 3 are arranged to cooperatively form a predetermined pattern on the mounting surface 21 of the base 2, and emit IR light for receipt by a lens 81 of the IR camera device 8.

The circuit board 31 of each circuit module 3 may be fixed to the base 2 by screw fastening (e.g., via screw holes 311), embedding, adhesion, welding, etc.

In this embodiment, the circuit board 31 is a square printed circuit board that is 70 mm by 70 mm in size, but its shape, size, and material can be changed as required to facilitate the calibration process, and this disclosure is not limited in this respect.

In this embodiment, the circuit boards 31 of the circuit modules 3 are arranged in a two-dimensional array on the mounting surface 21. In each row of the circuit boards 31, the circuit boards 31 are equidistantly arranged. In each column of the circuit boards 31, the circuit boards 31 are equidistantly arranged. Each circuit module 3 includes four IR light emitting components 32 that are arranged in a square, such that the IR light emitting components 32 are arranged in a two-dimensional array on the mounting surface 21. When viewing all of the circuit modules 3 as a whole, in each row of the IR light emitting components 32, the IR light emitting components 32 are equidistantly arranged, in each column of the IR light emitting components 32, the IR light emitting components 32 are equidistantly arranged, and the IR light emitting components 32 are so arranged that, with respect to any single IR light emitting component 32, an adjacent one of those of the IR light emitting components 32 in a same row and an adjacent one of those of the IR light emitting components 32 in a same column are equidistant from said single IR light emitting component 32. Subsequent calculation of image processing may take advantage of this configuration. However, as long as the IR light emitting components 32 are arranged in a predetermined pattern, and as long as two-dimensional (2D) pattern data (e.g., predetermined rules for determining positions in a two-dimensional space) and three-dimensional (3D) pattern data (e.g., predetermined rules for determining positions in a three-dimensional space) that correspond to the predetermined pattern are stored in the computer device 9, the above-described "equidistant arrangement" is not essential.

It is noted that this disclosure is not limited to the number of the IR light emitting components 32 included in each circuit module 3. In other embodiments, each circuit module 3 may include one, two or three IR light emitting components 32 or more than four IR light emitting components 32, while the IR light emitting components 32 of the circuit modules 3 still cooperatively form a predetermined pattern.

It is suggested that a total number of the IR light emitting components 32 in the circuit modules 3 be greater than or equal to four. Particularly, better precision may be obtained in the following image processing when the total number of the IR light emitting components 32 is greater than twelve. This disclosure does not provide a suggestion as to an upper limit for the total number of the IR light emitting components 32; however, it is required that the IR camera device 8 can capture IR light emitted by every IR light emitting component 32.

In this embodiment, the IR light emitting components 32 are IR light emitting diodes that emit light of between 730 nm and 1250 nm in wavelength. Particularly, the IR light emitting components 32 may be directional IR lighting components that are arranged to emit parallel IR light beams (i.e., the IR light beams are projected toward the same direction).

In this embodiment, the active calibration device 10 further includes a filter unit 4. The filter unit 4 is disposed between the IR light emitting components 32 and the IR camera device 8, and is configured to weaken light components emitted toward the IR camera device 8 and falling outside of a target frequency band corresponding to the IR light emitted by the IR light emitting components 32 (e.g., corresponding to a range of 850±10 nm in wavelength; the target frequency band can be selected as desired). That is, the light components whose wavelengths fall within the range of 850±10 nm will pass through the filter unit 4 and enter the IR camera device 8. The filter unit 4 may include one, two, or more filters. For instance, the filter unit 4 may include a band-pass filter, or a combination of a high-pass filter and a low-pass filter. Since the band-pass filter is a type of bell filter, light components whose wavelengths are close to two sides of the passband of the band-pass filter may not be effectively filtered out, a high-pass filter and a low-pass filter may be added to achieve better filtering.

The computer device 9 includes a processor 91 electrically connected to the IR camera device 8 for receiving the images captured thereby, and a storage component 92 (e.g., a hard disc drive, a solid state drive, a flash memory module, etc.) accessible to the processor 91 and storing the 2D pattern data and the 3D pattern data corresponding to the predetermined pattern formed by the IR light emitting components 32. The processor 91 is configured to perform image processing on the images of the active calibration device 10, which are captured by the IR camera device 8, thereby obtaining parameters used to calibrate information contained in images captured by the infrared camera device 8.

Figure 3:
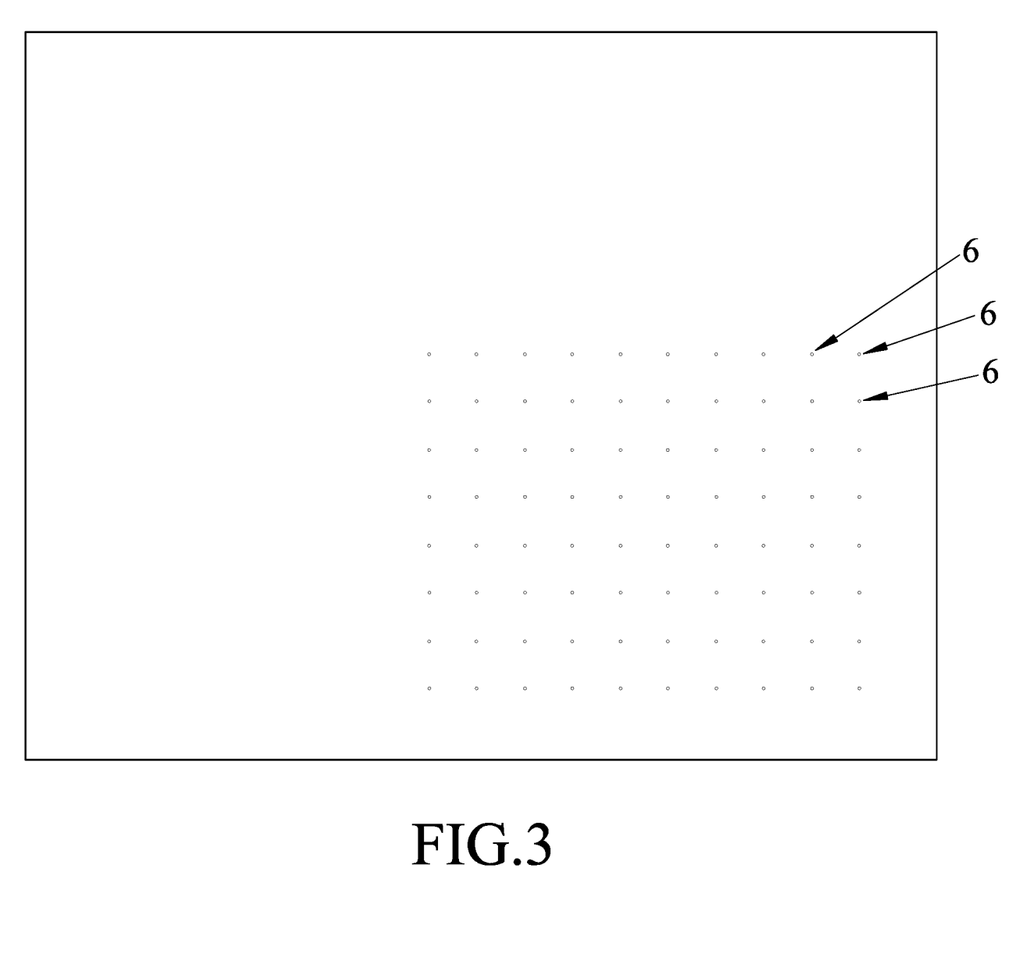
FIG. 3 is a schematic diagram illustrating an image of the embodiment of the active calibration device captured by the IR camera device.
Figure 4:
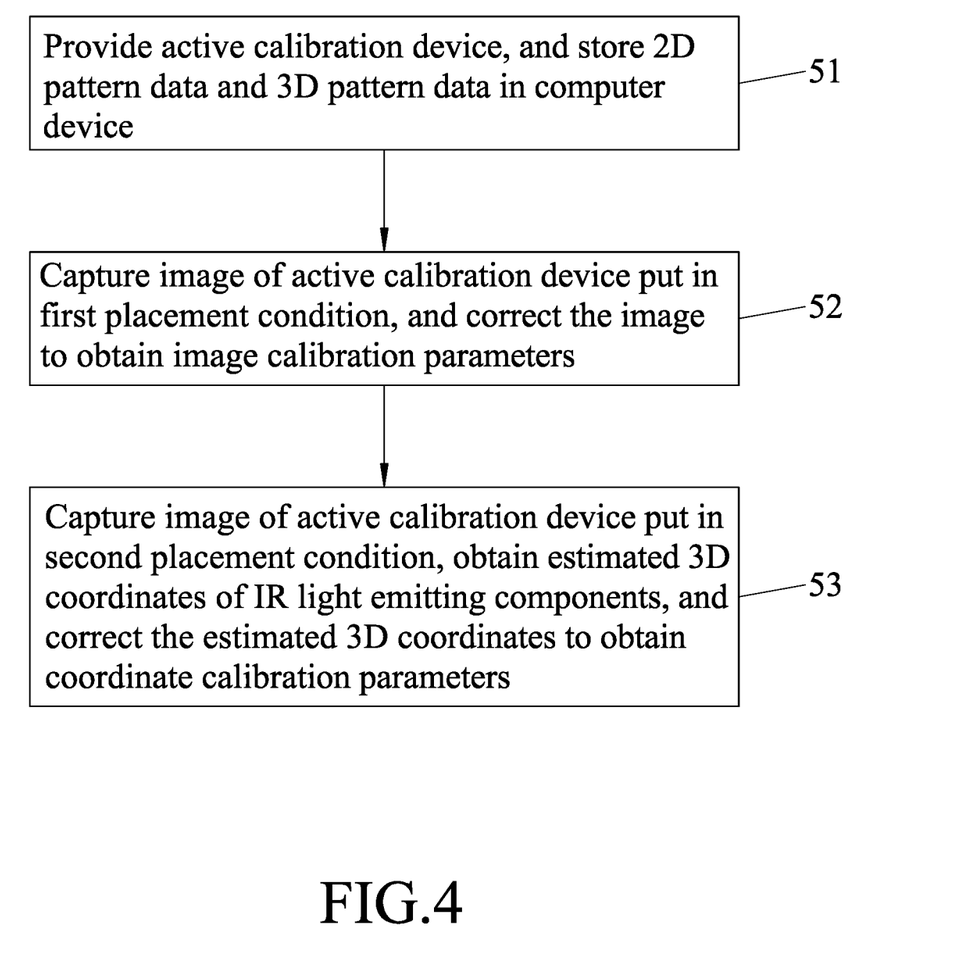
FIG. 4 is a flow chart illustrating steps of an embodiment of a method according to this disclosure, wherein the embodiment of the method is for obtaining parameters used to calibrate information contained in images captured by the IR camera device.

Referring to FIGS. 1, 3 and 4, a method for obtaining the parameters includes steps 51-53.

In step 51, the active calibration device 10 is provided or produced, and the 2D pattern data and the 3D pattern data that are pre-established and that correspond to the predetermined pattern formed by the IR light emitting components 32 are stored in the storage component 92.

In step 52, the active calibration device 10 is placed such that the mounting surface 21 of the base 2 is perpendicular to an optical axis of the lens of the IR camera device 8 and such that the IR light emitting components 32 face the IR camera device 8 (first placement condition), and the IR camera device 8 is used to capture front images of the active calibration device 10 put in the first placement condition.

FIG. 3 exemplarily illustrates a front image of the active calibration device 10. Since the filter unit 4 filters out light components with undesired wavelengths, light points 6 resulting from IR light emitted by the IR light emitting components 32 will be primary objects in the front image. In this embodiment, the processor 91 selects, from among the front images, a first reference image where a number of light points 6 in the first reference image is identical to the total number of the IR light emitting components 32. The processor 91 corrects the first reference image based on the 2D pattern data to obtain a corrected first reference image, such that the IR light emitting components 32 in the corrected first reference image form the (undistorted) predetermined pattern.

When the lens of the IR camera device 8 has errors (e.g., spherical errors), distortion may occur in the first reference image, so a pattern formed by the light points 6 may not match the predetermined pattern (e.g., not a rectangular array in this embodiment). For example, in this embodiment, the light points 6 in the same row and/or in the same column may form a curved line instead of a straight line (while it should be a straight line according to the predetermined pattern) due to the error of the lens, or the light points 6 in different rows and/or in different columns may form several lines that are not parallel to each other (while they should be parallel to each other according to the predetermined pattern) due to the error of the lens, so the pattern formed by the light points 6 may not form a rectangular array (i.e., the predetermined pattern formed by the IR light emitting components 32 in this embodiment). The processor 91 corrects the first reference image based on the 2D pattern data that corresponds to the predetermined pattern in such a way that the IR light emitting components 32 (i.e., the light points 6) in the first reference image thus corrected form the predetermined pattern (e.g., a rectangular array in this embodiment), thereby obtaining image calibration parameters for calibrating the images captured by the IR camera device 8. In one implementation, the image calibration parameters may be used by the IR camera device 8, so that the processor 91 can directly obtain corrected images from the IR camera device 8. In one implementation, the processor 91 may acquire raw images from the IR camera device 8, and use the image calibration parameters to correct the raw images so as to obtain calibrated images.

In step 53, the base 2 of the active calibration device 10 put in the first placement condition may be rotated (relative to an axis perpendicular to the mounting surface 21), moved, and/or tilted, so that the active calibration device 10 is changed to a second placement condition different from the first placement condition. Then, the IR camera device 8 is used to capture images of the active calibration device 10 in the second placement condition, and the processor 91 obtains the images of the active calibration device 10 in the second placement condition from the IR camera device 8. In this embodiment, the processor 91 selects, from among the images captured in step 53, a second reference image where a number of light points 6 in the second reference image is identical to the total number of the IR light emitting components 32. The processor 91 obtains estimated 3D coordinates of the IR light emitting components 32 based on the second reference image and the image calibration parameters (i.e., the estimated 3D coordinates are obtained based on an image calibrated using the image calibration parameters, and the calibrated image is deemed as having no image distortion). In detail, the processor 91 calculates the estimated 3D coordinates based on distances among the light points 6, and angles among virtual lines connecting the light points 6 in the second reference image. Then, the processor 91 corrects the estimated 3D coordinates of the IR light emitting components 32 based on the 3D pattern data in such a way that the 3D coordinates of the IR light emitting components 32 thus corrected match spatial positions of the IR light emitting components 32 of the active calibration device 10 which is put in the second placement condition, thereby obtaining coordinate calibration parameters for calibrating the 3D coordinates of the IR reflective markers obtained from the images captured by the IR camera device 8.

Detailed calculations/algorithms performed by the processor 91 to obtain the image calibration parameters and the coordinate calibration parameters should be well known to one having ordinary skill in the art (e.g., using currently available software programs, such as MATLAB®, OOOPDS, ImageJ, etc.), and explanations in these aspects are thus omitted herein for the sake of brevity.

It is noted that, in steps 52 and 53, the processor 91 may further perform image filtering and image enhancement on the images captured by the IR camera device 8, so the light points 6 would be clearer in the resultant images, facilitating the subsequent processing.

It is noted that step 52 may be repeated for different first reference images, and step 53 may be repeated for different second reference images, so as to obtain more reference data for calculating the corresponding calibration parameters.

In practice, since smart glasses or standalone navigation systems used in image-guided surgical navigation usually have two IR camera devices 8, the proposed method according to this disclosure should be applied to both of the IR camera devices 8 at the same time, so as to make the 3D coordinates acquired from the images captured by one of the IR camera devices 8 match the 3D coordinates acquired from the images captured by the other one of the IR camera devices 8.

In summary, the embodiment according to this disclosure may have the following advantages:

1. The circuit modules 3 are mounted to the base 2 in such a way that the IR light emitting components 32 form the predetermined pattern and emit IR light for receipt by the IR camera device 8. Since the IR light emitting components 32 are self-emissive components that actively emit IR light, and form the light points 6 in the images captured by the IR camera device 8, image recognition and/or edge detection, which are required when the conventional calibration board with black-and-white checkers is used and which may induce errors during the processing, are disposed of in this embodiment. Accordingly, this embodiment can reduce errors (e.g., quantization errors) which may occur during the image processing, and obtain the positions of the light points 6 with high precision, thereby achieving better calibration quality.

2. In comparison to producing a large single circuit board, producing a small circuit board may achieve higher processing precision and a higher yield rate. Furthermore, the base 2 may be processed using computer numerical control (CNC), so higher precision in position may be achieved for the IR light emitting components 32 on the multiple small circuit boards 31 mounted to the base 2, thereby promoting the precision of calibration (i.e., the obtained parameters would make the calibrated image/coordinates better match the reality). In an experiment, when the base 2 achieves 0.01 mm production precision or better, the calibration results (e.g., calibrated images or calibrated coordinates) may achieve 0.1 mm precision or better. When an IR camera device 8 with a higher image resolution is used, the calibration precision may be further enhanced.

3. By using directional IR light emitting components as the IR light emitting components 32 and making the IR light beams emitted thereby parallel to each other, the IR camera device 8 can capture the images of the predetermined pattern formed by the IR light emitting components 32 at a longer distance from the base 2, thereby minimizing the limitation on the distance between the IR camera device 8 and the active calibration device 10, and so installation of the system for calibration is facilitated and calibration precision is enhanced.

4. The IR light emitting components 32 are arranged in a 2D array, and are equidistantly arranged in rows and columns. Such a simple arrangement may facilitate the calculation and image processing required for performing the calibration.

5. The filter unit 4 is used to filter out light components that fall within undesired frequency bands, so most light components of the ambient light (e.g., from halogen lamps in the operating room) may be blocked from entering the IR camera device 8, and only the light components falling within the frequency band that corresponds to the IR light emitted by the IR light emitting components 32 and the IR light reflected by the IR reflective markers can be effectively received by the IR camera device 8. As a result, the precision in identifying target objects (e.g., the IR light emitting components 32 used during calibration or the IR reflective markers used in a surgical operation) can be promoted.

6. Before performing calculation to obtain the corrected first reference image and the estimated 3D coordinates, only the images that include every IR light emitting components 32 are selected from among all of the images captured by the IR camera device 8 for the calculation, so the calculation loading and identification errors may be reduced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An active calibration device for obtaining parameters that are used to calibrate information contained in images captured by an infrared camera device, said active calibration device comprising:

a base having at least one mounting surface;
a plurality of infrared (IR) light emitting components disposed on said mounting surface of said base, said IR light emitting components arranged to form a predetermined pattern, and configured to emit infrared light for receipt by a lens of the infrared camera device; and
at least one filter that is disposed between said IR light emitting components and the IR camera device, and that is configured to weaken light emitted toward the IR camera device and falling outside of a target frequency band that corresponds to IR light emitted by said IR light emitting components.

2. The active calibration device of claim 1, further comprising a plurality of circuit modules, each including:

a circuit board mounted to said mounting surface; and
at least one of said IR light emitting components mounted to said circuit board.

3. The active calibration device of claim 2, wherein said circuit boards of said circuit modules are arranged in a two-dimensional array on said mounting surface;

wherein in each row of said circuit boards, said circuit boards are equidistantly arranged; and
wherein in each column of said circuit boards, said circuit boards are equidistantly arranged.

4. The active calibration device of claim 1, wherein said IR light emitting components are directional IR lighting components that are arranged to emit parallel IR light beams.

5. The active calibration device of claim 1, wherein said IR light emitting components are arranged in a two-dimensional array on said mounting surface;

wherein in each row of said IR light emitting components, said IR light emitting components are equidistantly arranged; and
wherein in each column of said IR light emitting components, said IR light emitting components are equidistantly arranged.

6. The active calibration device of claim 5, wherein said IR light emitting components are so arranged that, with respect to any one of said IR light emitting components, an adjacent one of those of said IR light emitting components in a same row and an adjacent one of those of said IR light emitting components in a same column are equidistant from said one of said IR light emitting components.

7. The active calibration device of claim 1, wherein a number of said IR light emitting components is greater than twelve.

8. A method for obtaining parameters that are used to calibrate information contained in images captured by an infrared camera device, said method comprising:

providing an active calibration device, and storing two-dimensional pattern data and three-dimensional pattern data that correspond to the predetermined pattern in a storage component that is accessible to a processor, the active calibration device including a base that has at least one mounting surface, and a plurality of infrared (IR) light emitting components that are disposed on the mounting surface of the base, the IR light emitting components being arranged to form a predetermined pattern, and being configured to emit infrared light for receipt by a lens of the infrared camera device;
by the infrared camera device, capturing a first reference image of the active calibration device that is put in a first placement condition where the mounting surface is perpendicular to an optical axis of the lens of the infrared camera device and where the IR light emitting components face the infrared camera device;

by the processor, obtaining the first reference image of the active calibration device, and obtaining image calibration parameters by correcting the first reference image based on the two-dimensional pattern data in such a way that the IR light emitting components in the first reference image thus corrected form the predetermined pattern;

by the infrared camera device, capturing a second reference image of the active calibration device put in a second placement condition different from the first placement condition, the active calibration device being changed from the first placement condition to the second placement condition by one or more of i) rotating the base of the active calibration device that is in the first placement condition relative to an axis perpendicular to the mounting surface; ii) moving the base of the active calibration device that is in the first placement condition; and iii) tilting the base of the active calibration device that is in the first placement condition; and by the processor, obtaining estimated three-dimensional coordinates of the IR light emitting components based on the second reference image of the active calibration device and the image calibration parameters, and obtaining coordinate calibration parameters by correcting the estimated three-dimensional coordinates of the IR light emitting components based on the three-dimensional pattern data in such a way that the three-dimensional coordinates of the IR light emitting components thus corrected match spatial positions of the IR light emitting components of the active calibration device arranged in the second placement condition.

9. The method of claim 8, further comprising:
by the infrared camera device, capturing multiple first images of the active calibration device that is put in the first placement condition; and
by the infrared camera device, capturing multiple second images of the active calibration device that is put in the second placement condition;
wherein the obtaining the first reference image includes: selecting, from among the first images, the first reference image that includes a plurality of light points, a number of which is equal to that of the IR light emitting components disposed on the mounting surface; and
wherein the obtaining the second reference image includes: selecting, from among the second images, the second reference image that includes a plurality of light points, a number of which is equal to that of the IR light emitting components disposed on the mounting surface.

10. The method of claim 8, wherein the IR light emitting components are arranged in a two-dimensional array on the mounting surface;
wherein in each row of the IR light emitting components, the IR light emitting components are equidistantly arranged;
wherein in each column of the IR light emitting components, the IR light emitting components are equidistantly arranged; and
wherein the IR light emitting components are so arranged that, with respect to any one of the IR light emitting components, an adjacent one of those of the IR light emitting components in a same row and an adjacent one of those of the IR light emitting components in a same column are equidistant from said one of the IR light emitting components.

* * * * *